United States Patent [19]

Nutting

[11] Patent Number: 4,660,092
[45] Date of Patent: Apr. 21, 1987

[54] FOCUSING AID FOR A MANUALLY FOCUSED VIDEO CAMERA

[75] Inventor: Thomas C. Nutting, Fairport, N.Y.

[73] Assignee: Eastman Kodak Company, Rochester, N.Y.

[21] Appl. No.: 843,536

[22] Filed: Mar. 25, 1986

[51] Int. Cl.$^4$ .......................... H04N 5/232; H04N 5/30
[52] U.S. Cl. ...................................... 358/224; 358/227
[58] Field of Search ............... 358/227, 224, 209, 183, 358/22, 182

[56] References Cited

U.S. PATENT DOCUMENTS

| | | | |
|---|---|---|---|
| 4,282,548 | 8/1981 | Plummer | 358/227 |
| 4,317,135 | 2/1982 | Pitruzzello | 358/227 |
| 4,463,384 | 7/1984 | Fujikawa et al. | 358/227 |
| 4,481,540 | 11/1984 | Bergen | 358/227 |
| 4,484,225 | 11/1984 | Bishop | 358/227 |
| 4,586,090 | 4/1986 | Wilman et al. | 358/227 |
| 4,589,031 | 5/1986 | Tsuji | 358/227 |
| 4,599,653 | 7/1986 | Kimura et al. | 358/224 |

FOREIGN PATENT DOCUMENTS 55-79576A 6/1980 Japan .
59-61374A 4/1984 Japan .

Primary Examiner—Gene Z. Rubinson
Assistant Examiner—Stephen Brinich
Attorney, Agent, or Firm—David M. Woods

[57] ABSTRACT

A focusing aid for a video camera alleviates manual focusing uncertainty due to difficulty in rendering sharply defined features in an electronic viewfinder. The focusing aid impacts a central viewing area by modifying the picture contrast, a visual substitute for a bandwidth-limited rendition of picture sharpness. A high frequency component of a luminance signal generated by the camera is converted into a dc control signal having an amplitude that varies with high frequency content. By using the control signal to adjust the gain applied to the luminance signal, the contrast of the picture formed in the central area is accentuated according to the degree of focus.

10 Claims, 3 Drawing Figures

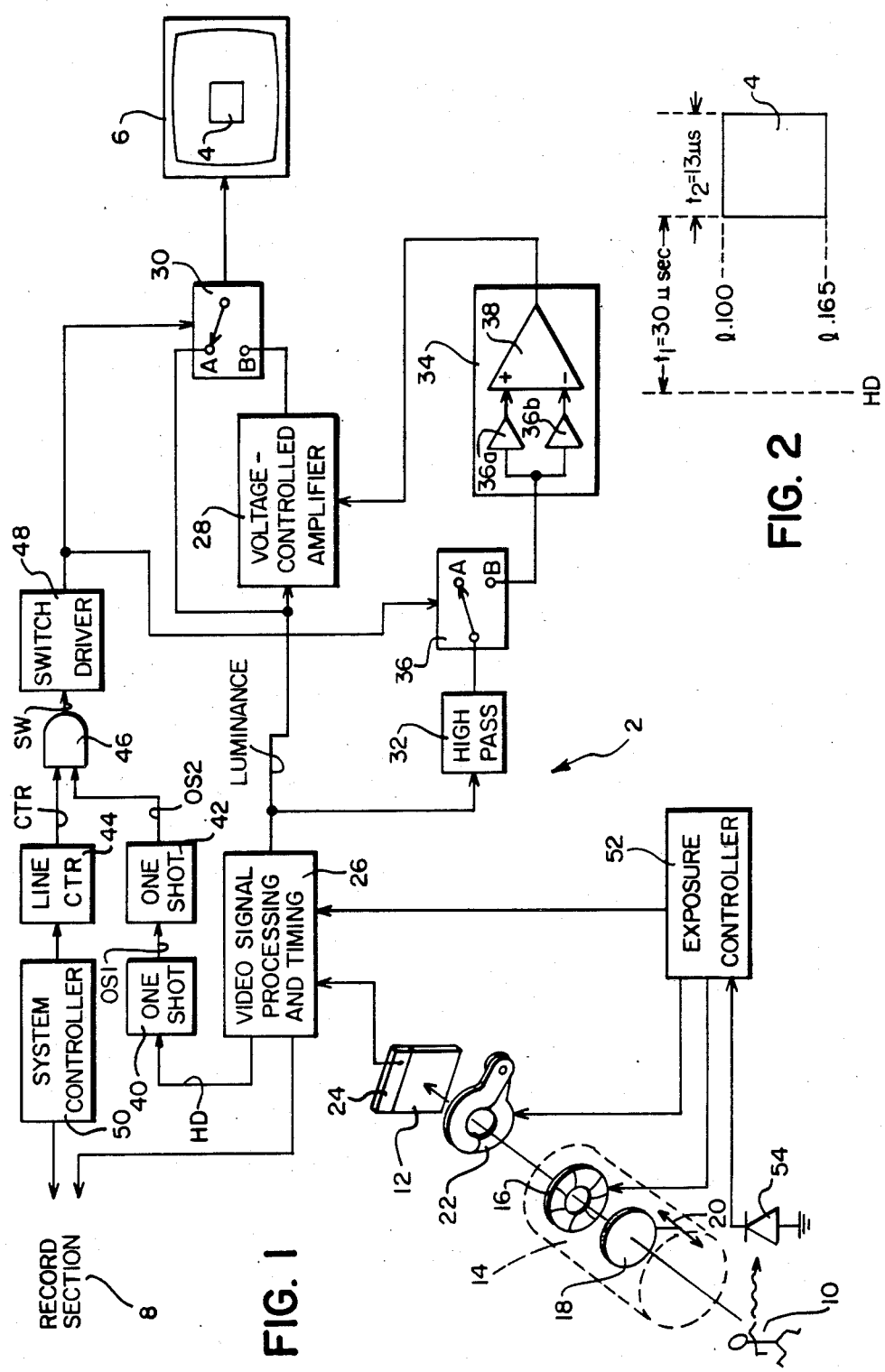

FOCUSING AID FOR A MANUALLY FOCUSED VIDEO CAMERA

BACKGROUND OF THE INVENTION

1. Field of the Invention

This invention relates to a focusing arrangement for a video camera, and especially to an arrangement for aiding manual focusing through an electronic viewfinder. More specifically, the invention pertains to a signal processing circuit of the type that isolates a focus-related characteristic of a video signal and uses the isolated characteristic to accentuate the display of a well-focused image in the viewfinder.

2. Description Relative to the Prior Art

In a manually focussed video camera, an electronic viewfinder is not only used to compose a scene as recorded by the camera but also to determine when the scene image is properly focused. As is the case with many optical systems, the proper focus is not a discrete distance but a range of distances through which the image is acceptably defined, i.e., a range indicated by the depth of field for a particular optical (lens) aperture and subject distance. An electronic viewfinder repeats images of the scene at the television frame rate, i.e., 1/30 second. This "exposure interval" dictates a particular lens aperture for the existing light condition and, therefore, establishes a particular depth of field for each subject distance. A special problem emerges when the viewfinder is used with a video still camera, which provides several exposure interval and aperture combinations for each light condition. The light condition that dictates a certain aperture ... and thus a certain depth of field ... for the electronic viewfinder may require an entirely different aperture for the still exposure (because the exposure interval may not be 1/30 second). Thus the depth of field for viewing may be an artificial indication of the actual picture-taking condition. The "real" depth of field may be considerably compressed from that observed in the viewfinder with the attendant possibility that a properly-focused viewfinder display may be unfocused with respect to the recorded picture.

If one could reliably locate the central focus position for the displayed depth of field, the picture would be in focus for any aperture (that is, for any depth of field). Owing, however, to the small size of the display screen in the viewfinder and the limited bandwidth available for the display, differences between details shown on the viewfinder screen are not very sharp or clear. Searching for optimum focus, necessary in view of the depth of field considerations heretofore mentioned, is a procedure marked by uncertainty. U.S. Pat. No. 4,481,540 suggests one arrangement for dealing with such focus problems. Two versions of the video signal, one unmodified and the other blurred by a low pass filter, are applied to the viewfinder via a switching device controlled by the high frequency content of the video signal. The unmodified part of the image is switched to the display during the presence of high frequency content while the blurred part of the image is displayed otherwise. As the image is brought into focus, more unmodified image, and less of the intentionally blurred image, appears in the viewfinder.

The focusing arrangement in U.S. Pat. No. 4,481,540, however, requires a special viewing mode that detracts from the other purpose of the viewfinder ... to observe the scene as recorded by the camera. Secondly, the focused image, which is scattered throughout the field of view, requires the viewer to key upon the whole picture rather than to concentrate attention upon some unshifting area. But most importantly, the relatively low bandwidth of the electronic viewfinder ordinarily limits the rendition of high frequency, well-focused picture information. The difference between the blurred and the unmodified but focused image is ordinarily not great enough to be eye-catching.

SUMMARY OF THE INVENTION

Instead of using a focus-related characteristic, such as high frequency content, to switch the video signal to the electronic viewfinder, the isolated characteristic can be used directly to modify the display signal. The trick, however, is to modify the signal in a way that is not defeated by the limited bandwidth of the system. To this end the focus-related characteristic of the video signal, e.g., the high frequency content, is used according to the invention to vary the gain applied to the video signal within a selected area of the viewfinder display. This ties picture contrast, a readily observable quality, to focus. Furthermore, having the focusing information confinded to a selected area of the field of view results in a less intrusive display and permits one display to serve both purposes ... composition and focusing.

A special display that accentuates the focused part of the image is provided as follows. A high pass filter isolates the high frequency content of the video signal. The average amplitude of the high pass signal is converted into a control signal that couples with a voltage controlled amplifier to regulate its gain according to the average amplitude of the high frequencies in the video signal. The voltage controlled amplifier is switched into the path of the video signal whenever the selected area is being traced in the viewfinder display. In this way, a partial area of the display, ordinarily the center, will show a level of contrast that varies with the degree of focus—the more contrast, the greater the focus.

BRIEF DESCRIPTION OF THE DRAWINGS

The invention will be described with reference to the drawings, wherein:

FIG. 1 is a diagram of portions of a video camera, including circuit components for an electronic viewfinder in accordance with the invention;

FIG. 2 is a raster diagram of the central part of the viewfinder display as provided by the circuit components of FIG. 1.

DETAILED DESCRIPTION OF THE INVENTION

Figure 3:
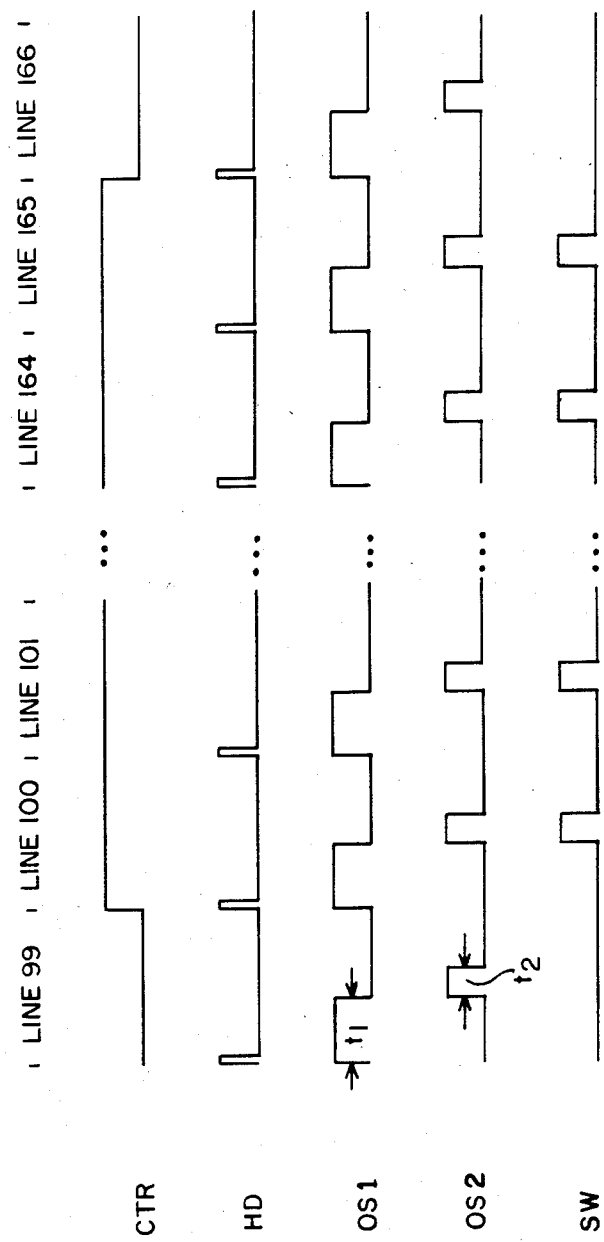
FIG. 3 is a set of timing diagrams relating to the operation of the circuit components of FIG. 1.

FIG. 1 stresses those elements of a video still camera 2 that are useful in generating a focusing aid within a central area 4 of the display screen of a monochrome electronic viewfinder 6. Other elements of the camera, either omitted or not shown in detail, may be readily selected from like elements known in the art. For example, the entire record section 8 of the camera, which is unessential to an understanding of the invention, may be provided by ordinary components well known in this art.

FIG. 1 will be described, as necessary, with reference to the raster diagram in FIG. 2 and to the timing diagrams in FIG. 3. Referring to FIG. 1, a subject 10 is imaged upon an image sensor 12 by an imaging assembly 14. Within the imaging assembly 14 is a diaphragm 16 for controlling the optical aperture of the assembly, i.e., for determining the amount of imaging light to reach the sensor 12. Also included in the assembly 14 is a lens system 18 that is manually movable according to an arrow 20 in order to focus an image of the subject 10 upon the sensor 12. (The imaging assembly 14 is typically a barrel-like structure having a knurled exterior ring connected by conventional gearing to the lens system 18 for adjusting the focus setting.) A light shutter 22 is interposed between the lens assembly 14 and the sensor 12 for controlling the exposure interval. The sensor 12 is, for example, an interline transfer device having a horizontal register 24 from which a video signal is removed line-by-line in a known fashion.

The video signal obtained from the sensor 12 is applied to a video signal processing and timing circuit 26, which includes the necessary matrices for generating luminance and color difference signals. The luminance and color difference signals are directed to the record section 8. The luminance signal is also separately directed to the viewfinder 6 via a pair of alternative circuit paths. In one path, the luminance signal is provided directly to the viewfinder 6; in the other path, it is first branched through a voltage-controlled amplifier 28. Which circuit path is connected to the viewfinder 6 is determined by the condition of a switch 30. The voltage-controlled amplifier 28 controls the gain applied to the luminance signal according to a control voltage representing a focus-related characteristic of the luminance signal. Since high frequency content is associated with the sharpness, or focus, of the image, a high pass filter 32 is used to isolate the focus-related characteristic, i.e. the high frequency component, of the luminance signal.

The isolated high requency component is applied to a peak-to-peak detector 34 via a switch 36. When the switch 36 is closed the detector 34 converts the average amplitude of the high frequency component to a dc control voltage (the sharper the focus, the greater the dc voltage). Within the detector 34 the positive- and negative-going extremes of the high frequency component are separated by a peak detector 36a and a valley detector 36b and applied to the inputs of a differential amplifier 38 operated as an integrator. The decay times of the peak and valley detectors 36a and 36b are equivalent to about one video field (16 ms.) so that the peak detector 34 smoothly follows changes in the high frequency component. The output dc voltage from the detector 34 is used to control the gain of the voltage-controlled amplifier 28 (the sharper the focus, the greater the gain). As the gain of the amplifier 28 is increased, the contrast of the picture produced by the video signal is increased (the sharper the focus, the greater the contrast). The picture generated by the signal from the amplifier 28, therefore, will pass from average contrast to high contrast and back again as the lens system 18 is manually adjusted through the range of sharpest focus.

The position of the switch 30 determines whether the unmodified video signal or the contrast-adjusted video signal will be displayed in the viewfinder 6. The switch 30 is activated to pass the contrast-adjusted video signal only during the time the display in the viewfinder 6 corresponds to the central area 4. The video signal processing and timing circuit 26 produces a horizontal drive signal HD (see also FIG. 3) at the beginning of the retrace of each video line. The drive signal HD initiates a series of events that controls the switch 30. A one-shot multivibrator 40 triggers on the rising edge of the horizontal drive signal HD and provides an output signal OS1 to a second one-shot multivibrator 42. The pulse width of the signal OS1 is set to 30 $\mu$seconds, which corresponds spatially up to the beginning of the central area 4 (see FIG. 2). A second pulse signal OS2 from the one-shot multivibrator 42 originates on the falling edge of the first signal OS1 and has a width (13 $\mu$seconds) corresponding to the width of the central area 4 (see FIG. 2). Meanwhile a line counter 44 is triggered at the beginning of each field to count the display lines produced in the viewfinder 6. When the counter 44 is between lines 100 and 165 (considering consecutive lines in one field), its output signal CTR is set high (see FIG. 3). This period corresponds to the height of the central area 4 (see FIG. 2).

The signals CTR and OS2 are applied to an AND gate 46; when both signals are high the output of the gate 46 becomes high (see FIG. 3) and causes a switch driver 48 to throw each of the switches 30 and 36 from respective contacts A to contacts B. This provides the contrast-adjusted signal from the voltage controlled amplifier 28 to the viewfinder 6 during the time the central area 4 is being generated. The switch 36 is also closed but only during this time, to ensure that the integrated output signal of the peak detector 34 only represents the high frequency component seen in the central area 4. Otherwise, due to signal retention in the integration process, the output signal from the detector 34 would represent focused image parts from other areas within the display.

The video camera 2 normally employs a control system, represented by a system controller 50, to manage the operation of the overall system. In FIG. 1, the controller 50 has only been shown connected to the line counter 44 and the record section 8 but, as is well known, the controller 50 would be connected to various other components as necessary in a particular application. An exposure controller 52 is shown separate from the system controller 50 to emphasize exposure-related functions that affect the viewed picture, namely the sampling of imaging light by a photodiode 54 and the operation of the diaphragm 16 and the shutter 22.

The circuit as described in connection with FIG. 1 feeds enhanced information into the viewfinder pertaining to the best focus position for the subject of interest. The portion of the image in the central area 4 will tend to "snap" in and out of focus as the lens system 18 is adjusted through the best focus position. The "snappiness" of the picture, however, is not so much a function of the perceived sharpness . . . which tends to be dulled in the band-limited field of view . . . but moreso a function of the abruptly changing contrast within the central area 4. The point of highest contrast is more easily perceived under these conditions than the point of sharpest focus, which is especially important if the lens system 18 is to be adjusted to the approximate center of the depth of field for a given aperture.

The invention has been described in detail with particular reference to a presently preferred embodiment, but it will be understood that variations and modifications can be effected within the spirit and scope of the invention.

What is claimed is:

1. In video apparatus of the type that isolates a focus-related characteristic of a video signal and uses the isolated characteristic to modify a video display generated within an electronic viewfinder, the improvement wherein said video apparatus comprises:

means for generating a control signal from the focus-related characteristic of the video signal; and means responsive to the control signal for varying the gain applied to the video signal generating the video display in the viewfinder whereby the visual appearance of the display accentuates the focus-related characteristic.

2. The apparatus as claimed in claim 1 in which said means for generating a control signal comprises means for separating the focus-related characteristic from the video signal and means for generating a control signal representing the amplitude of the separated characteristic.

3. In a video camera having a signal processing circuit of the type that isolates a high frequency component of a video signal and uses the isolated high frequency component in generating a special video display within a particular display area in an electronic viewfinder, the improvement wherein said signal processing circuit comprises:

means for generating a control signal representing the high frequency component of the video signal;

means for varying the gain applied to the video signal according to the amplitude of the control signal;

switching means for providing alternative circuit paths for the video signal to the viewfinder, one path providing the video signal directly to the viewfinder and the other path sending the video signal first through said variable gain means; and means for triggering said switching means so as to confine the variable gain video signal to the particular area of the viewfinder display.

4. Apparatus as claimed in claim 3 in which said means for generating a control signal comprises a high pass filter for isolating the high frequency component of the video signal and means for converting the average amplitude of the isolated high frequency component into the control signal.

5. Apparatus as claimed in claim 4 in which said means for varying the gain applied to the video signal comprises a voltage controlled amplifier responsive to the voltage level of the control signal.

6. In a manually-focused video camera having a signal processing circuit of the type that isolates a high-frequency component of a video signal and uses the isolated high frequency component to modify the video signal before it generates a video display in an electronic viewfinder, the improvement wherein the signal processing circuit comprises:

a high pass filter for separating a high frequency luminance component of the video signal;

means for generating a dc voltage representing the peak amplitude of the high frequency luminance component;

a voltage controlled amplifier responsive to the level of said dc voltage;

a circuit path through which the video signal is applied to the electronic viewfinder; and means for including said voltage controlled amplifier in the circuit path whenever the video signal is tracing a selected area of the video display.

7. Apparatus as claimed in claim 6 in which said circuit path includes a direct path through which said video signal is applied to the viewfinder and an alternative path including said voltage controlled amplifier.

8. In a video camera having an image sensor which generates a video luminance signal having a high frequency content representative of the focused components of the image reaching the sensor, the camera further including an electronic viewfinder providing a video display of the image and a signal processing circuit for isolating the high frequency content and for modifying the display produced in the viewfinder according to the focus condition of the image, the improvement wherein the signal processing circuit comprises:

filter means for generating a filtered signal representative of the high frequency content of the video luminance signal;

means for generating a control voltage representing the amplitude of the filtered signal;

circuit means for providing either a direct circuit path for the video signal to the viewfinder or an alternative circuit path in which the video signal is modified before reaching the viewfinder;

means disposed in the alternative path for varying the gain of the video signal according to the level of the control voltage; and means coupled to said circuit means for selecting the alternative path whenever the video signal corresponds to a selected partial area of the video display in the viewfinder.

9. Apparatus as claimed in claim 8 in which said means for generating a control voltage generates a dc voltage representing the peak-to-peak amplitude of the high frequency content of the video signal.

10. Apparatus as claimed in claim 9 in which said means for generating a control voltage includes an integrator for providing the dc voltage representing the peak-to-peak amplitude of the high frequency content of the video signal only during the period when said alternative path is selected.

* * * * *